June 5, 1945. G. A. BERGLUND 2,377,476
MICRO FILM PROJECTOR
Filed May 15, 1943 6 Sheets-Sheet 1

INVENTOR
GUSTAV ARTHUR BERGLUND
BY
ATTORNEY

June 5, 1945.　　　G. A. BERGLUND　　　2,377,476
MICRO FILM PROJECTOR
Filed May 15, 1943　　　6 Sheets-Sheet 2
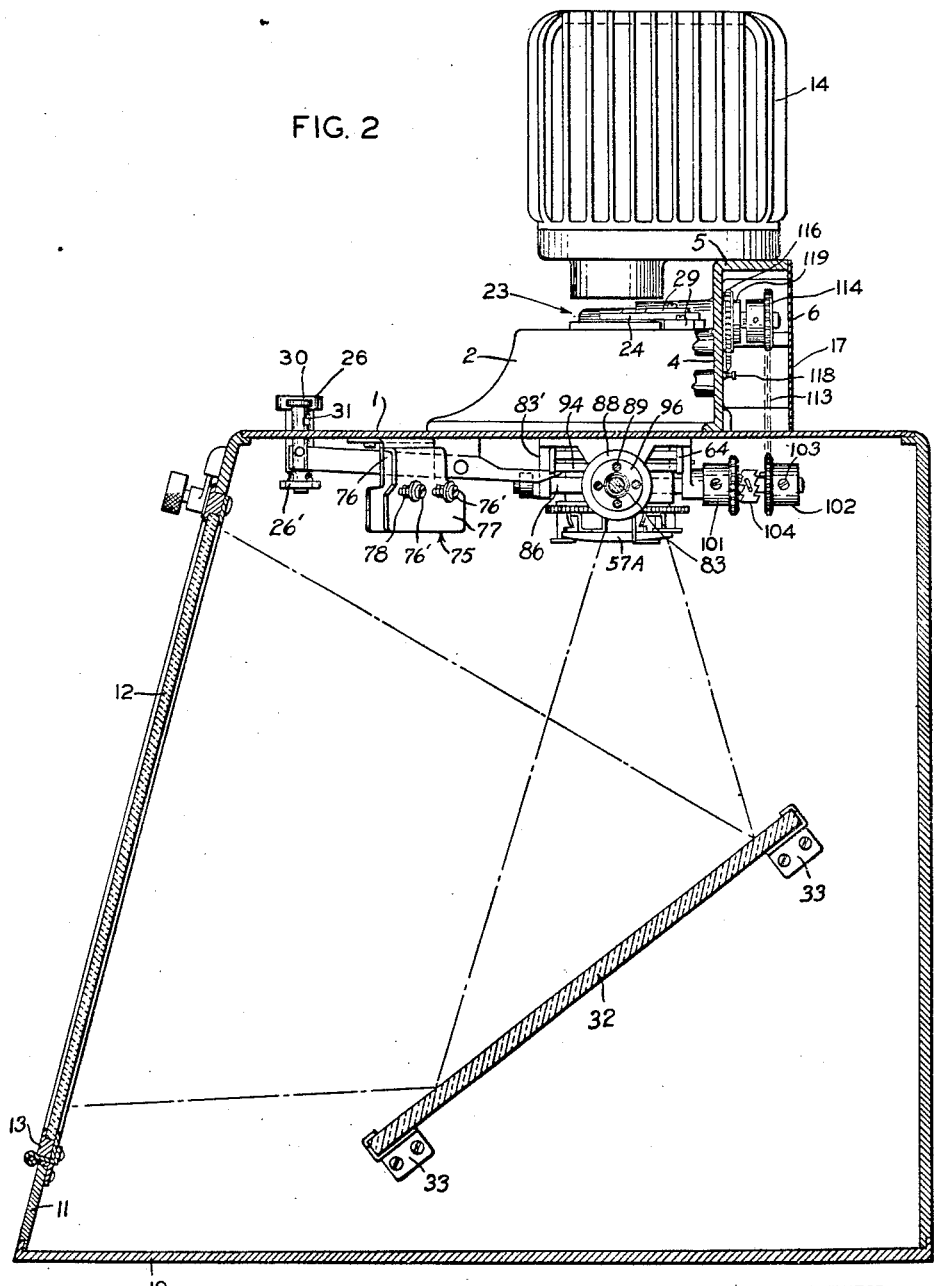
INVENTOR
GUSTAV ARTHUR BERGLUND
ATTORNEY

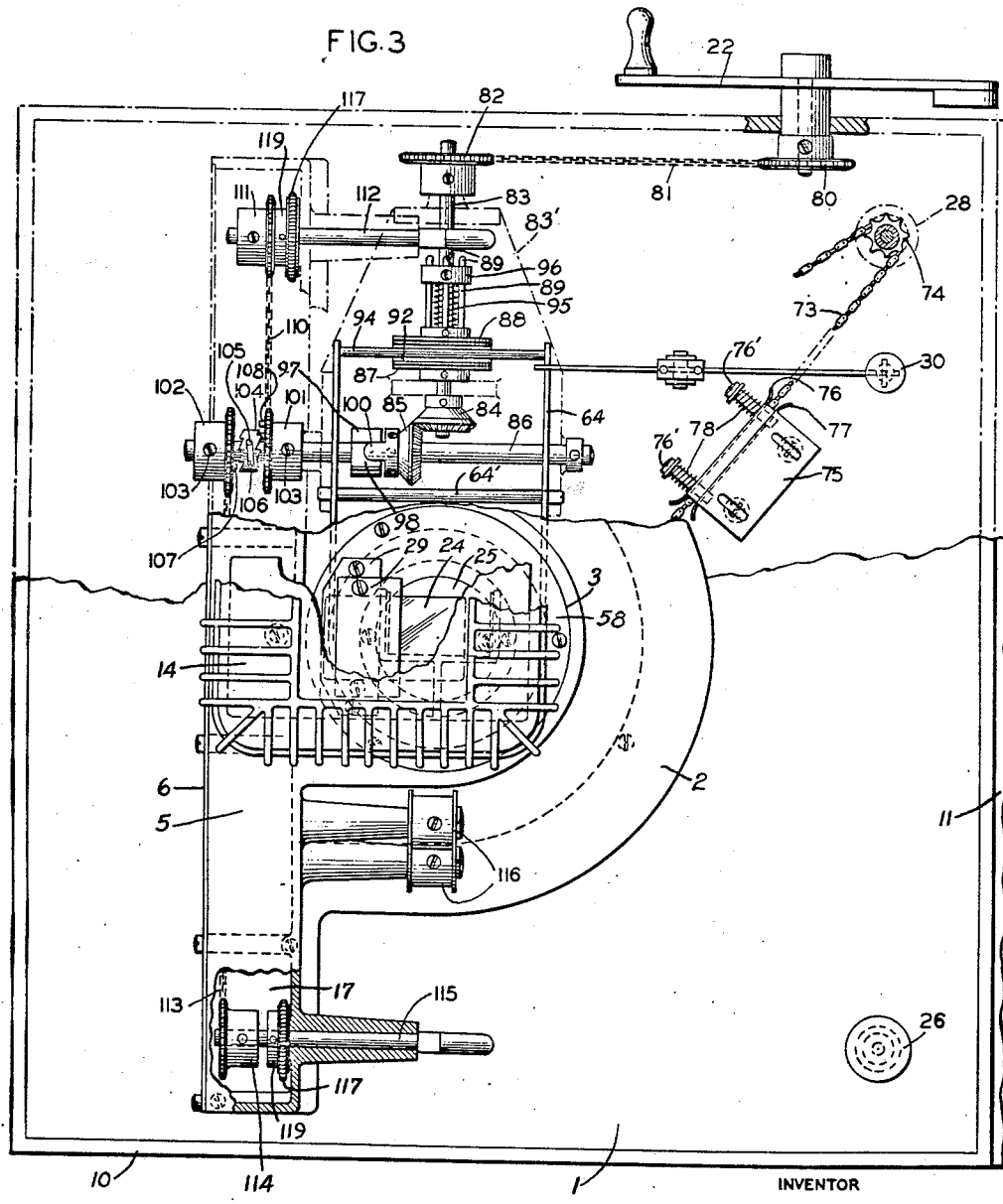

June 5, 1945.　　　G. A. BERGLUND　　　2,377,476
MICRO FILM PROJECTOR
Filed May 15, 1943　　　6 Sheets-Sheet 4
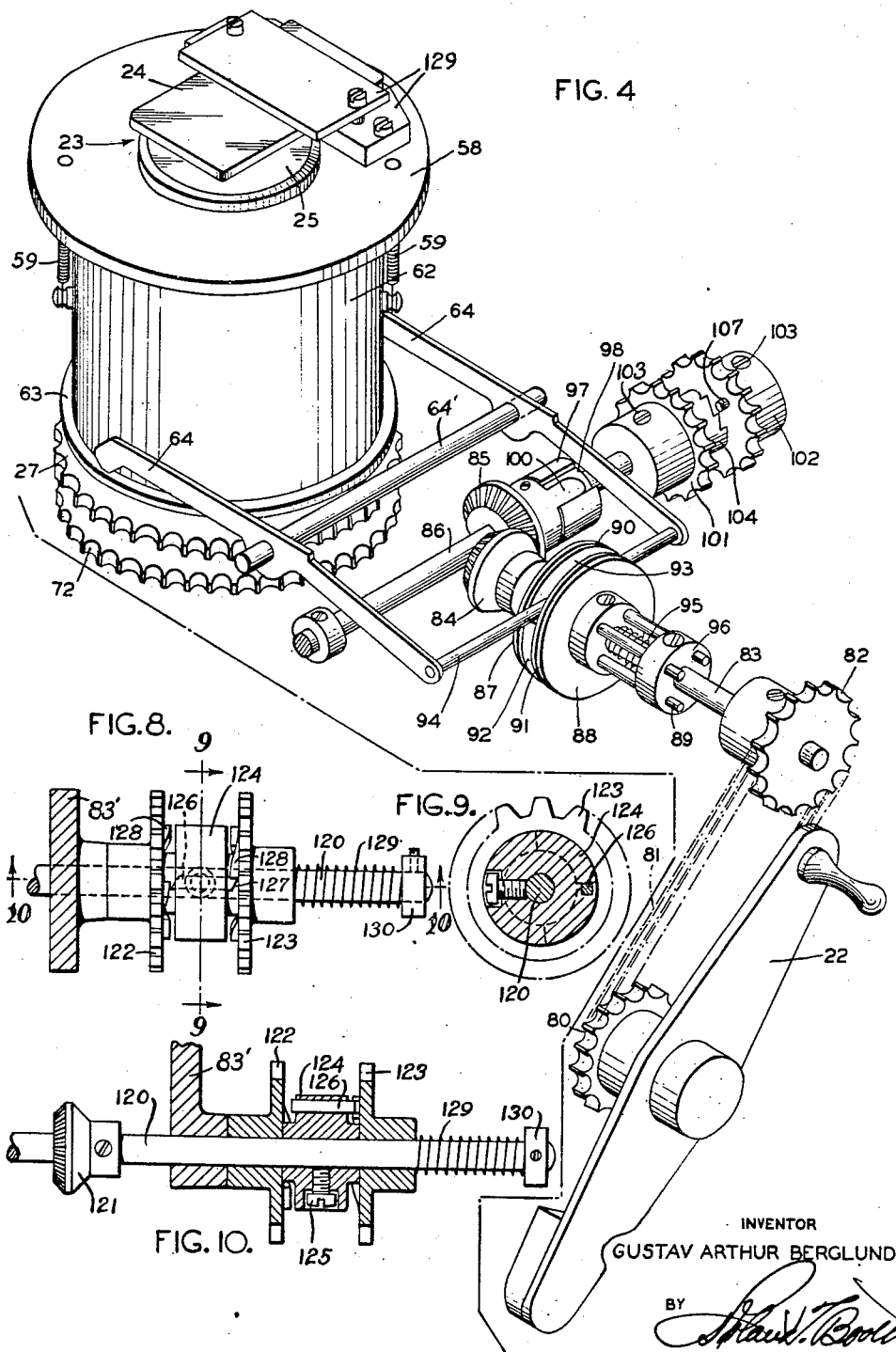
INVENTOR
GUSTAV ARTHUR BERGLUND
BY
ATTORNEY

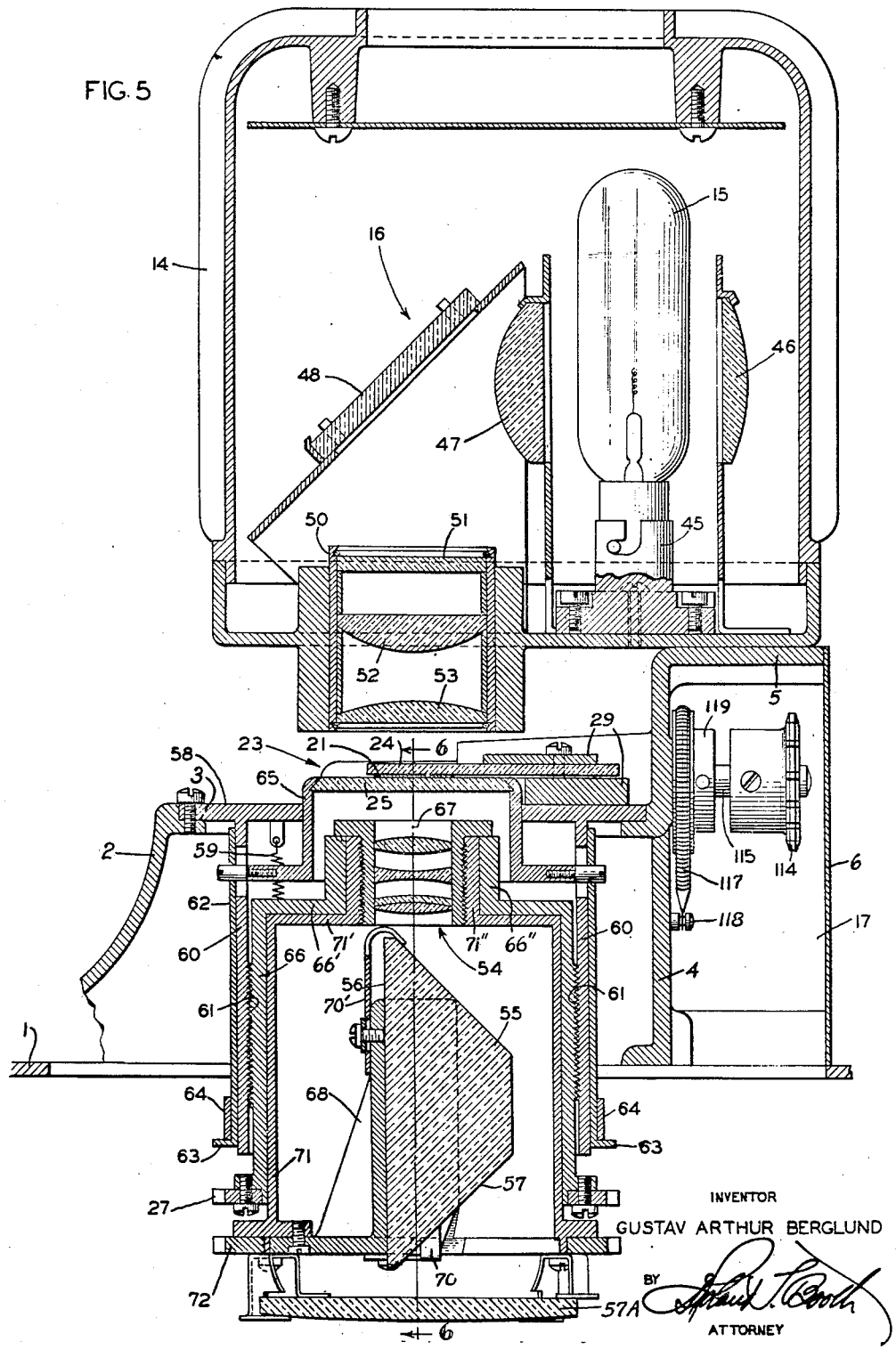

June 5, 1945.    G. A. BERGLUND    2,377,476
MICRO FILM PROJECTOR
Filed May 15, 1943        6 Sheets-Sheet 6
FIG.6.
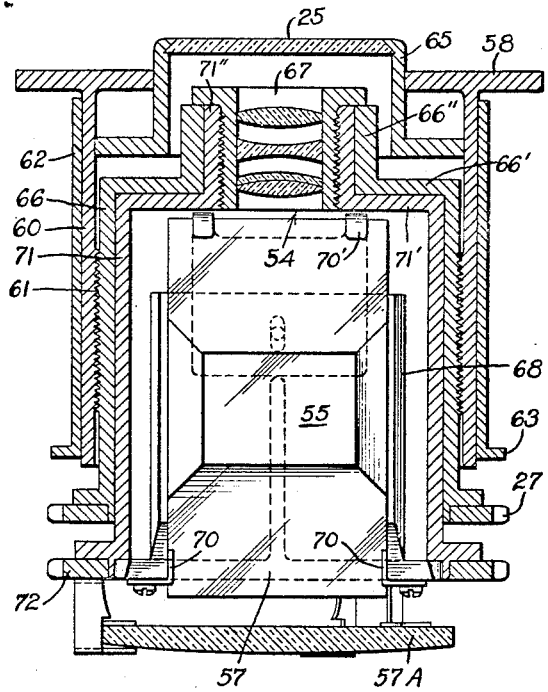
FIG.7.
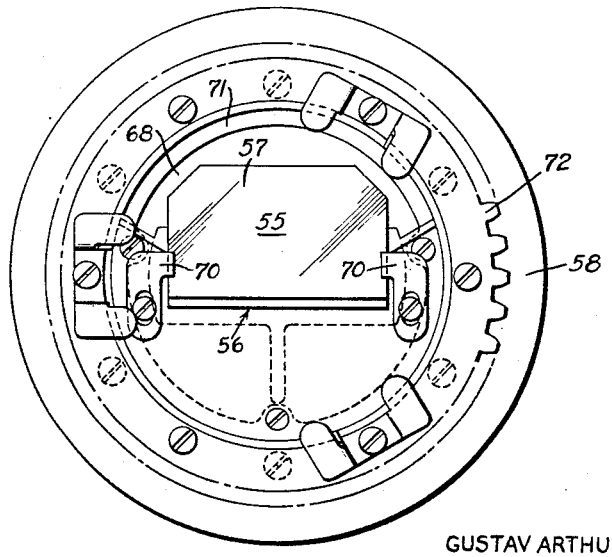
Inventor
GUSTAV ARTHUR BERGLUND
By
Attorney Patented June 5, 1945

2,377,476

UNITED STATES PATENT OFFICE 2,377,476

MICROFILM PROJECTOR

Gustav Arthur Berglund, Dobbs Ferry, N. Y., assignor to Remington Rand Inc., Buffalo, N. Y., a corporation of Delaware Application May 15, 1943, Serial No. 487,110

9 Claims. (Cl. 88—24)

This invention relates to projectors for showing photographs made on continuous transparent strip film, and more particularly relates to that type of film projector which is employed to examine photographs of documents which have been recorded on 16 mm. negative film.

The present invention resides in the provision of a film gate opening structure, which opens the gate before the film may be moved in either direction. The invention also provides means for rotating the image on a translucent or other type of screen without moving the film or the film supporting structure. In further detail, separate controls are provided for rotating the image, focusing the image, and locking open the film gate.

An object of the invention is to obtain a brightly illuminated full size image of a previously photographed document in a self-contained projector box which may be viewed in a room lighted with ordinary illumination.

Another object of the invention is to enable the operator to rotate the image of the document photographed by turning a small knob located at a convenient point on the projector assembly.

Another object of the invention is to diminish the probability of scratching the film by accidentally pulling it through a film gate which has not been opened.

Another object of the invention is to facilitate more rapid location of photographed documents on a roll of film.

In the drawings:

Fig. 2 is a cross sectional view taken from the right as shown in Fig. 1 and shows the lamp housing in elevation with the reflector and box in cross section;

Fig. 3 is a top view of the projector, with parts of the top broken away to show the details of the film gate opening structure;

Fig. 4 is a detail isometric view of the mechanism which pulls the film through the gate and holds the gate open during this operation;

Fig. 5 is an enlarged cross sectional view of the lamp housing and lens system taken through the center of the machine viewed from the right as shown in Fig. 1.

Fig. 6 is a cross section taken on line 6—6 of Fig. 5.

Fig. 7 is a bottom plan view of the gate support and associated structure shown in Fig. 6 with the lower lens omitted.

Fig. 8 is an enlarged detail showing a modified form of film drive mechanism.

Fig. 9 is a cross section taken on line 9—9 of Fig. 8.

Fig. 10 is a longitudinal cross section taken on line 10—10 of Fig. 8.

Figure 1:
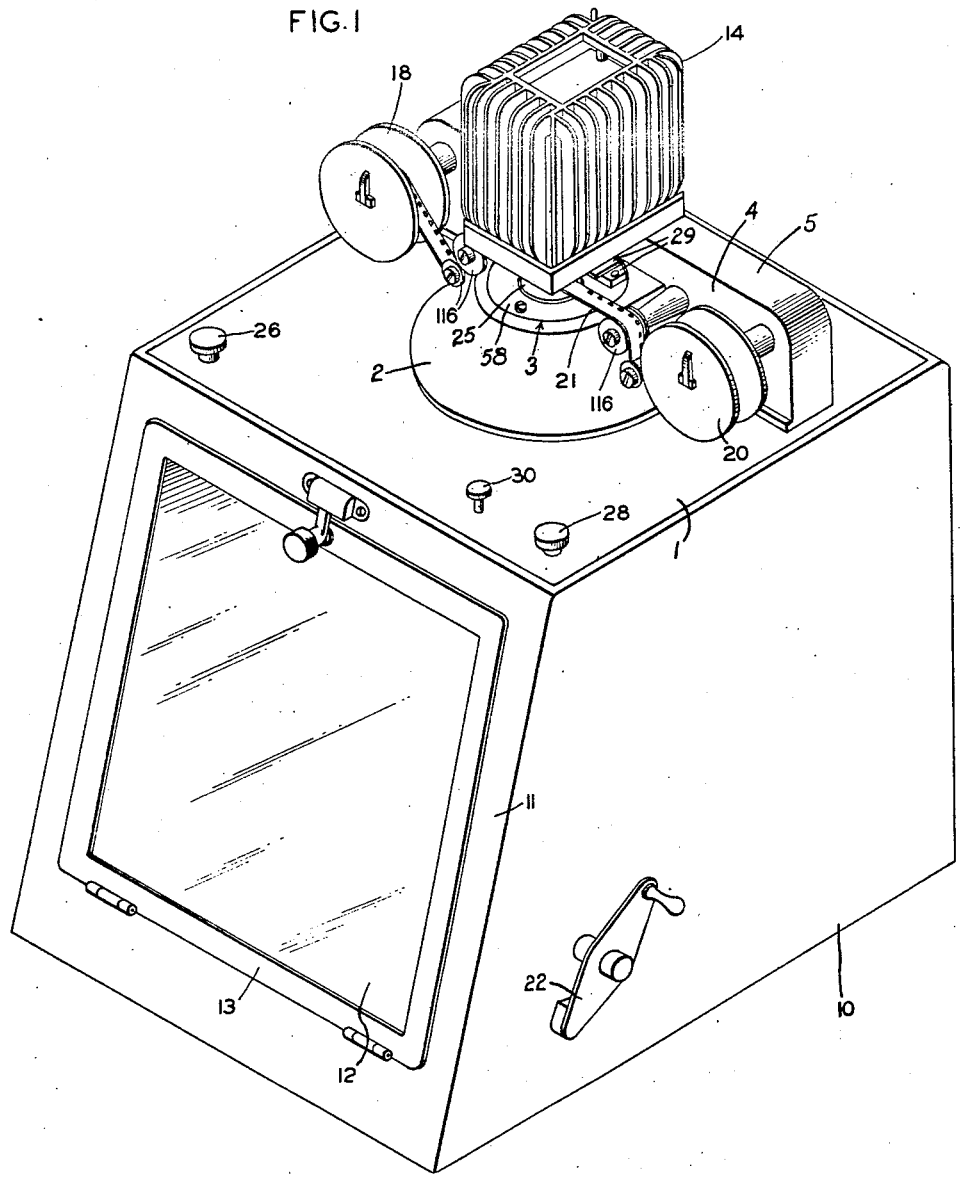
Fig. 1 is an isometric view of the entire machine.

Referring now to Figs. 1, 2 and 3, the projector consists of a box 10, which is similar to a cube except that the front wall 11 thereof is inclined at an angle of approximately 75° with the base. A projector screen 12 is positioned in front wall 11 and is held by an appropriate frame 13. Frame 13 is hinged to front wall 11 at the bottom and has a latch at the top holding the screen in closed position.

Box 10 has top plate 1 mounted about its margins in a seat formed in the side, front and back walls as shown in Fig. 2.

A gate housing 2 is mounted over a central opening in top plate 1 and has a seat 3 formed about an opening in registry with the opening in top plate 1 for receiving gate support 58 suspended through said openings as shown in Fig. 5. A wall 4 of said gate housing is provided with projections to form bearings for shafts 112 and 115 and to support pulleys 116.

Lateral flange 5 about the top and end edges of wall 4 provide compartment 17 closed by and accessible through cover 6 secured to the rear edge of said flange.

A lamp housing 14 is mounted on lateral flange 5, contains lamp 15 (see Fig. 5) and a series of lenses forming a light condensing system 16. Directly beneath lamp housing 14 is a compartment 17 formed by wall 4, flange 5 and back cover 6 housing mechanical means for rotating two spools 18 and 20 on which a film 21 is wound.

A crank 22 at the right-hand side of the box is used to move the film from one spool to the other passing through film gate 23. The film gate 23 is composed of two pieces of glass, one of these is a stationary fixed plate 24, while the second is a vertically movable plate 25. Plate 24 is secured by plates 29 to gate support 58. As indicated in Figs. 2, 4 and 5, the two plates hold film 21 securely in place by means of a resilient mounting hereinafter to be described in detail.

When the operator first turns crank 22, the first movement of about 20° lowers plate 25 so that the film may run free. Subsequent motion of the crank will move the film through the gate in either direction as desired. When the handle is released by the operator, the resilient mounting presses plate 25 upwardly and again clamps the film in the focal plane of the lens.

On the top plate of the projector near the forward edge is a focusing knob 26. This knob communicates its motion by means of a sprocket chain to a sprocket wheel 27 (see Fig. 5). Also on the top plate of the projector case is a knob 28, which is used by the operator to rotate the image on the screen 12. The details of this operation will be hereinafter described. A third knob 30 may be used by the operator to hold the gate permanently in an open position and is used when the film is adjusted or when the film is inserted or removed. A small notch 31 (see Fig. 2) is cut in the shaft of knob 30 so that the operator may depress the knob and push it forward a small amount, thereby latching it in its depressed position. After the film has been adjusted, the gate may be closed by pulling the knob toward the observer, and it will snap back into place again.

A large glass mirror 32 is positioned in the interior of box 10 to reflect the rays of light from the optical system toward screen 12, where the resultant image is produced. The mirror 32 is detachably mounted on suitable brackets 33 secured to the sides of box 10.

The source of light for the optical system, as has already been indicated, is the tungsten filament light 15, which is supported in a bayonet socket 45 firmly secured to the base of lamp housing 14. Behind the lamp is a silvered lens 46, which acts in the same manner as a spherical reflector unit. The silvered lens 46 receives light from the lamp filament and reflects it back on the filament itself, in a manner well known in the art.

A condenser lens 47 forming part of system 16, is positioned directly in front of lamp 15 to render the rays of light approximately parallel. This condensing lens generally has a flat surface on one side and a parabolic surface on the other side. After being converted to parallel rays the light strikes mirror 48, which is silvered on its front surface. This mirror is inclined at an angle of 45° so that the light reflected therefrom will proceed vertically downward to lens barrel 50 mounted in the lamp housing base and also forming part of system 16. At the upper end of barrel 50 a plain piece of heat absorbing glass 51 is interposed to keep as much heat out of the lens system as possible.

The light next passes through two condenser lenses 52 and 53, which focus the parallel beam from mirror 48 to a focus which is approximately at the center of a projection lens 54. The projection lens 54 may be any good quality photographic lens. The one shown in Fig. 5 is a three element lens, one component of which is a doublet. Between condensing lens 53 and projection lens 54 the light passes through the two plates 24 and 25 of film gate 23 and film 21, and the optical arrangement must be such that the complete film is illuminated by the condensed light beam.

After leaving projection lens 54 the light enters a Dove prism 55. As the light enters the entrance face, it is refracted toward the hypotenuse side 56. This side is generally silvered so that a reflection will always occur here and the light will then proceed through the exit face 57, where it is again refracted and proceeds in a generally downward direction. The large size of the prism, as indicated in Fig. 5, is necessary because the rays of light, as they leave projection lens 54, will spread out to enclose a considerable angular field, thereby using almost the entire exit face 57 as they emerge.

Since the entrance and exit faces of the Dove prism are inclined at an angle of 45° to the axial rays, the light rays passing through the prism should be parallel. That is, the individual pencils should be focused at infinity to avoid astigmatic distortion. In order to attain such a condition lens 54 is adjusted so that the film is in the focal plane. Then another lens 57A mounted on and below prism carrier 71 is placed near the prism exit face to render the rays convergent and cause them to be focused on screen 12.

The Dove prism is employed solely as a means of rotating the image on the screen. This phenomenon is well known in the art of geometric optics and has been used in submarine periscopes and other vertical telescopic sights. One half turn of the Dove prism 55 will result in a complete rotation of the image on screen 12.

Gate support 58 is used to mount the film gate 23. Support 58 has a plate formed with tubular extension 60 internally threaded at 61. A plate supporting tube or member 62 has a flange 63 at the bottom thereof and is slidable on the outside of extension 60. This flange is engaged by lever member or rock lever 64 in the opening and closing movements of the gate as hereinafter described. The bottom plate 25 of film gate 23 is supported in tubular housing 65 bolted to tube 62 through slots in extension 60 and moves up and down with tube 62.

Tubular housing 65 slidably engages in and extends through an aperture in gate support 58 as shown in Fig. 5. Tension springs 59 secured at one end to plate supporting tube 62 and at the other end to the underside of support 58 normally hold plate 25 in an upper position to engage and hold the film against stationary plate 24. Lever arms 64 are mounted in spaced parallel relation on pivot rod 64' rotatable in bearings depending from bearing frame 83' carried by top plate 1.

A focusing tube 66 is threaded in threads 61 of extension 60. Sprocket wheel 27 is mounted on the lower end of focusing tube 66. The upper end of tube 66 is provided with an end wall 66' carrying a reduced cylindrical extension 66'' in axial alignment therewith.

A prism carrier 71 of cylindrical tubular form is slidably mounted within focusing tube 66. Prism carrier 71 has an end wall 71' engaging end wall 66' of focusing tube 66 and a reduced cylindrical extension 71'' projecting upwardly therefrom and rotatably engaged in cylindrical extension 66''. Tubular extension 71'' is internally threaded as shown in Fig. 5 for threadedly receiving and mounting coupling member 67. Coupling member 67 secures prism carrier 71 to focusing tube 66 for rotation therein. Coupling member 67 also carries the projection lens assembly 54.

A prism bracket 68 is detachably secured to the lower end of prism carrier 71 and has Dove prism 55 secured thereto by clips 70 and 70'. The lower end of prism carrier 71 extends below the lower end of focusing tube 66 and has sprocket 72 mounted on the lower end thereof. An endless chain 73 is mounted on sprocket 72 of prism carrier 71 and sprocket 74 on the lower end of knob 28 so that upon manual rotation of knob 28 sprocket wheel 72 will be rotated to turn prism carrier 71 and prism 55 for rotating the position of the image on screen 12. The prism may be rotated in either direction and to any desired extent.

A brake 75 is mounted on the underside of the top wall of box 10 in a position to engage a portion of the chain engaged over sprockets 72 and 74. This brake has two brake members 76 and 77. Brake member 76 is in the form of a bracket having a lateral extension at one end secured to the underside of the top wall of box 10. Brake member 77 has a lateral extension at one end for engaging brake member 76 in order to hold the brake members in spaced relation at one end while the opposite ends are free to move toward and away from one another.

Brake member 76 carries a pair of guide pins 76' slidably supporting brake member 77 having openings to receive the pins. Coil springs 78 are engaged over pins 76' between heads on the outer free ends thereof and brake member 77 for normally urging brake member 77 toward brake member 76. The side edges of each brake member throughout the portions thereof that engage opposite sides of the chain are curved outwardly away from each other in order that the chain will be smoothly guided between the brake members. By screw threading guide pins 76' into brake member 76, adjustment of the pins will vary the spring tension and the braking pressure between brake members 76 and 77 to provide the desired braking action on the chain for thereby controlling the operation of the chain and for normally holding prism carrier 71 in adjusted position. Prism carrier 71 is held in adjusted position by brake 75 against rotation during operation of focusing knob 26 for rotating focusing member 66.

The film 21 is wound from one film spool to the other by operating handle 22. This handle is secured to a shaft journaled in the right-hand side of the box which mounts sprocket wheel 80 on the inside of the box. A chain 81 is engaged over sprocket wheels 80 and 82. Sprocket wheel 82 is secured to one end of shaft 83 rotatably mounted in bearing frame 83' secured to the underside of top plate 1 of the projector. A bevel gear 84 is secured at the other end of shaft 83. This gear meshes with another similar gear 85 freely rotatable on cross shaft 86. Shaft 86 is rotatably mounted in frame 83'.

Two clutch plates 87 and 88 are mounted on shaft 83, plate 87 being rigidly attached while plate 88 is slidable and prevented from turning on the shaft by means of rods 89 slidably engaged in collar 96. Two leather or felt washers 90 and 91 are positioned against the inner faces of clutch plates 87 and 88 and between these washers is placed a thick circular gate actuating or cam disc 92 with a wide slot 93 cut in one side thereof. Slot 93 is wide enough to accommodate rod 94 which is moved by disc 92 to open the film gate and release the film. In order to provide the proper frictional drag between the clutch plates and gate operating disc 92, a spring 95 is positioned about shaft 83 between slidable clutch plate 88 and collar 96. Collar 96 is firmly secured to shaft 83 by means of a suitable set screw.

A cylindrical member 97 is secured to shaft 86 and has a wide slot 98 cut in the periphery thereof. A tongue 100 extending from mitre gear 85 engages in slot 98. The slot 98 is approximately twice as wide as tongue 100 and, therefore, considerable back-lash or lost motion always results when a turning force is transmitted by means of this mechanism. The purpose for this lost motion will be hereinafter described.

At the rear end of shaft 86 there are two sprocket wheels 101 and 102 freely rotatable on the rear end of shaft 86 and held from transverse motion by set screws 103 fitting into circular grooves on the shaft. A floating ratchet 104 is mounted for free movement on shaft 86 between gears 101 and 102. The movement of ratchet 104 is controlled by pin 105 which works in slot 106 cut in the periphery of ratchet wheel 104. The slot 106 is cut so that in rotation shaft 86 will move pin 105 to cam the ratchet wheel toward the rear of the machine if the motion is counter-clockwise and toward the front of the machine if the motion is clockwise.

A pin 107 is mounted on the inside face of sprocket wheel 102 and a similar pin 108 is attached to the inside face of sprocket wheel 101. These two pins are arranged for engagement by the teeth of ratchet wheel 104 so that, when shaft 86 is turned in one direction by handle 22, one of the sprocket wheels will be turned while the other is left stationary. Reversing the motion of crank 22 will disengage the ratchet wheel from one of the sprocket wheels and cause it to engage the other. This ratchet wheel structure operates so that the film is pulled through the film gate by operating the spool on which the film is wound while the other spool idles.

Sprocket wheel 101 operates chain 110 to rotate sprocket wheel 111 directly connected to shaft 112 carrying means for detachably securing a film spool 20 thereon. Sprocket wheel 102 operates sprocket chain 113 to rotate sprocket wheel 114 and shaft 115 for turning the other film spool 18. Two pairs of idler pulleys 116 are mounted on opposite sides of the film gate for receiving and guiding the film through the film gate.

When the operator turns the handle 22 the immediate result is the turning of shaft 83 and the partial rotation of disc 92, which raises rod 94 to operate lever 64 in a direction to push down on plate supporting tube 62 thereby separating lower plate 25 of film gate 23 from upper plate 24. The movement of rod 94 is restricted to such an extent that disc 92 cannot continue more than one-eighth of a revolution in either direction, and, therefore, after this initial motion, it will cease to revolve and discs 87 and 88 will continue to move by slipping over washers 90 and 91. The dimensions of slot 98 and tongue 100 are such that the rotary motion is transferred to shaft 86 about the time film gate 23 is fully opened. Then rotation is given to either one of the sprocket wheels 101 and 102 and its associated film spool 18 or 20 will be rotated to pull the film through the open gate.

If the operator now stops rotating handle 22, but holds it in place, the film will stop moving, but gate 23 will not close. It is necessary to either remove the hand from crank 22 or else allow the crank to move back a short distance so that the gate will close and bring the film again into the focal plane of the projection lens. This backward motion is obtained by the tension of springs 59 pulling plate supporting tube 62 upwardly and operating lever 64 to return disc 92 to a position where rod 94 seats at the bottom slot 93. This small backward motion is just sufficient to move tongue 100 into the center of slot 98, so that the film may subsequently be moved in either direction with the initial conditions of alignment always present. In order to put a brake on the film spools so that they will stop after a fast motion of the film, two spring brakes 117 anchored to pins 118 are placed around brake pulleys 119 rigidly secured to film shafts 112 and 115.

A modified form of film drive is shown in Figs. 8 to 10. A shaft 120 is rotatably mounted in bearing frame 83' in place of shaft 86 and carries the bevel gear 121 rigidly mounted thereon in mesh with bevel gear 84 so that in the rotation of shaft 83, shaft 120 will be simultaneously rotated. Sprockets 122 and 123 are rotatably mounted on shaft 120 adjacent one of the bearings of bearing frame 83'. These sprockets are in spaced relation on opposite sides of clutch collar 124 rigidly secured to shaft 120 by set screw 125. Clutch collar 124 carries a slidable clutch pin 126 extending in transverse relation and formed with beveled ends 127. Clutch teeth 128 are formed on sprockets 122 and 123 to provide a shoulder for engagement with the ends of clutch pin 126. The shoulders on one sprocket extend or face in the opposite direction to the shoulders on the other sprocket. Clutch teeth 128 also have cam faces for engagement with the inclined faces 127 on the ends of clutch pin 126.

A compression spring 129 is engaged between sprocket 123 and collar 130 secured on the end of shaft 120 for normally moving sprocket 123 towards sprocket 122 and clutch collar 124.

With this film drive construction chains 110 and 113 are engaged over sprockets 122 and 123 respectively, for driving spindles 112 and 115 according to the direction of rotation of shaft 120.

When handle 22 is rotated in one direction it will rotate shaft 120 in one direction thereby rotating clutch collar 124. Rotation of clutch collar 124 will cause cam face 127 on one end of clutch pin 126 to engage the cam face on the clutch teeth 128 of one of the sprockets for producing end-wise movement of clutch pin 126 so that the opposite end will engage the shoulder of clutch teeth 128 on the other sprocket. This will cause rotation of the sprocket having the clutch pin engaged with the shoulder of a clutch tooth 128 thereon and result in driving one of the spindles. There is a certain amount of lost motion in the drive between the spindles and the rotation of handle 22 so that film gate 25 will be moved to the open position before clutch pin 126 engages the shoulder of clutch teeth 128 for driving one of the sprockets.

When handle 22 is rotated in the opposite direction the slidable movement of clutch pin 126 is reversed and the other sprocket is driven in a manner that will be clear from the foregoing description. Spring 129 allows for end-wise movement of sprocket 123 to compensate for any binding action, should any take place between clutch teeth 128 on the two sprockets during the shifting movement of clutch pin 126. This type of film drive mechanism is found to be very satisfactory in the operation of the projector to give sufficient lost motion for the opening movement of film gate 25 before clutch pin 126 engages clutch teeth 128 to wind the film on one of the spindles.

The tubular carrier 71 and focusing tube 66 are shown in Fig. 5 as being in telescoped relation in each other and tubular extension 60, with the focusing lens and prism in axial relation within these tubes and in coaxial optical relation to each other. The knobs provide a convenient remote control in operation of these tubes to thread the focusing tube in tubular extension 60 for focusing an image on the screen while one of the knobs may be rotated for rotating carrier 71 within focusing tube 66 to rotate the position of an image on the screen into reading position. This provides a very compact unit which can be made with precision in such a manner that all parts of the lens system for protecting the light, holding the film and focusing the image together with the control of this position are mounted in fixed relation to each other on the top plate in order that an efficient construction can be made economically to obtain the desired results in the projection of film for reading on the screen.

It will be noted that the friction drive for gate actuating disc 92 provides an efficient means for moving the film gate into open position during the feeding of film through the gate. The tension on clutch plates 87 and 88 may be varied by controlling the position of collar 96 on shaft 83. By this means the desired amount of friction drive can be obtained for disc 92 to secure efficient operation of the movable plate of the film gate to open position.

It will be understood that with either form of film drive clutch mechanism illustrated in the drawings, the clutch collar or the clutch pin is shifted back and forth longitudinally axially of the shaft for selectively driving one of the spindles. The lost motion occurring in the shifting of the clutch before engagement with one of the sprocket wheels to feed film allows movable plate 25 to be first moved into open position.

The invention claimed is:

1. A projector, comprising a box, a top plate secured to and forming the top of said box, a gate support fixed in position on said top plate and having a tubular extension, a film gate having stationary and movable plates, said stationary plate being secured to said gate support perpendicular to the axis of said extension, a tubular housing carrying said movable plate longitudinally slidable in the tubular extension on said gate support in substantially perpendicular relation toward and from said stationary plate, a tubular carrier rotatably mounted in said tubular extension and longitudinally adjustable therein, a focusing lens and image positioning prism mounted in fixed axial relation in said carrier, means on said top plate for mounting and feeding film through said film gate operable to engage and move said tubular housing and movable plate into open spaced relation to said stationary plate in advance of feeding film through said gate, and manually operable means for rotating said carrier to focus and position an image from a film held by said plates in said film gate in readable relation on a screen.

2. A projector, comprising a gate support fixed on said projector and having a tubular extension, a film gate having stationary and movable plates, said stationary plate being attached to said support, a tubular housing carrying said movable plate slidably mounted in said tubular extension on said support for movement toward and from said stationary plate, a plate supporting member slidably mounted on said tubular extension and having said tubular housing secured thereto, a rock lever pivoted on said projector having one end engaged with said plate supporting member, resilient means connecting said plate supporting member and gate support for normally moving said movable plate into closed film clamping position against said stationary plate, and means for supporting and feeding film through said film gate in either direction having a friction rotated cam for engaging the opposite end of said rock lever for moving it to operate said plate support and move said movable plate into open spaced relation to said stationary plate during feeding of film through said film gate.

3. A projector, comprising a box, a gate support fixed on said box and having a tubular extension, a film gate formed of a stationary plate mounted on said support and a movable plate, a tubular housing carrying said movable plate having portions slidable through an opening in said support and portions slidable on said tubular extension, resilient means normally actuating said tubular housing to move said movable plate toward said stationary plate, a lever pivoted on said projector with one end connected to said tubular housing, a manually rotated shaft, a gate actuating disc rotatably mounted on said shaft and engaging the other end of said lever for rocking said lever upon rotation in either direction, and friction drive means on said shaft engaging said disc operable to partially rotate said disc to operate said lever and housing in the rotation of said shaft for moving said film gate into open position with said plates separated.

4. A projector, comprising a stationary gate support formed of a plate portion having a tubular extension, a film gate having a stationary plate mounted on said plate portion of said gate support and a movable plate, a tubular housing carrying said movable plate slidably mounted in said plate portion and tubular extension, a plate supporting tube slidable on said tubular extension and attached to said tubular housing, a lever pivoted on said projector having one end engaging said plate supporting tube, a rotatable shaft in said projector, a disc rotatable on said shaft engaging the other end of said lever for rocking said lever on its pivot to move said plate supporting tube and tubular housing axially on said tubular extension for moving said movable plate to open said film gate, friction drive means on said shaft engaging and operating said disc for rocking said lever, and means for normally operating said plate supporting tube to hold said movable plate in film gate closing position, said plate supporting tube effectively guiding the operation of said movable plate.

5. A projector, comprising a film gate formed of stationary and movable plates for holding a film therein, means for normally moving said movable plate toward said stationary plate, a rock lever pivoted on said projector having one end connected to said movable plate, a rotary shaft for operating film feeding means in said projector, a disc rotatable on said shaft having means engaging the opposite end of said lever for rocking said lever when rotated, a pair of friction discs mounted on said shaft on opposite sides of said first mentioned disc, one of said friction discs being fixed on said shaft, means for resiliently and slidably urging the other friction disc toward said fixed friction disc while held on said shaft against rotation to provide driving frictional engagement between said discs for rotating said first mentioned disc to operate said lever and move said movable plate of said film gate to open position when said shaft is rotated in either direction.

6. A projector, comprising a top plate, a gate support having a tubular extension carried by said top plate, a film gate having a stationary plate mounted on said gate support and a movable plate, means normally moving said movable plate toward said stationary plate for clamping film therein, a tubular carrier rotatably mounted in said tubular extension, means for moving said carrier axially in said extension, a focusing lens and positioning prism mounted in optically coaxial relation in said carrier, a manually operated remotely positioned control means on said top plate connected to operate said prism carrier axially in said extension for focusing an image from said film on a screen and another manually operated remotely positioned control means on said top plate connected to rotate said prism carrier for rotating the image on said screen into reading position.

7. A projector, comprising a top plate, a film gate carried by said top plate, a tubular extension carried by said top plate, a tubular carrier threaded in said tubular extension and independently rotatable therein, a focusing lens and positioning prism mounted in optically coaxial relation in said carrier, a rotatable knob on said top plate remote from said film gate connected to said carrier for moving it on the threaded connection with said tubular extension for focusing an image projected from film in said film gate on to a screen, and a rotatable knob on said top plate connected to said carrier independent of said first mentioned knob for rotating said carrier in said tubular extension for rotating the image into reading position on said screen.

8. A projector, comprising a top plate, carrying a film gate for holding film to be projected onto a screen, a tubular extension carried by said top plate, a focusing tube threaded in said extension, a prism carrier rotatable in said focusing tube, a focusing lens and positioning prism mounted in said carrier in optically axial relation, a manually operable means on said top plate remote from said extension connected with said focusing tube for threading said tube in said extension to focus an image of film in said gate on said screen, and another manually operable means on said top plate remote from said extension for rotating said carrier and prism for rotating an image on said screen into reading position.

9. A projector, comprising a top plate carrying a film gate for holding film to be projected on to a screen, a tubular extension carried by said top plate, a focusing tube and a tubular prism carrier mounted in coaxial telescoping relation within one another and said tubular extension, said focusing tube having a threaded connection with said tubular extension, means retaining said carrier rotatably engaged in said focusing tube, a focusing lens and image positioning prism mounted within said tubular carrier in optically coaxial relation, means on said top plate remote from said extension and connected to said focusing tube for threading said focusing tube in said extension for focusing an image projected from film in said gate on said screen, and another means on said top plate remote from said extension and connected with said carrier for rotating said carrier in said focusing tube for rotating an image on the screen into reading position.

GUSTAV ARTHUR BERGLUND.